(12) United States Patent
Odajima

(10) Patent No.: US 10,680,501 B2
(45) Date of Patent: Jun. 9, 2020

(54) VIBRATION ACTUATOR

(71) Applicant: Nidec Copal Corporation, Tokyo (JP)

(72) Inventor: Shin Odajima, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 15 days.

(21) Appl. No.: 16/304,579

(22) PCT Filed: Apr. 14, 2017

(86) PCT No.: PCT/JP2017/015376
§ 371 (c)(1),
(2) Date: Nov. 26, 2018

(87) PCT Pub. No.: WO2017/203890
PCT Pub. Date: Nov. 30, 2017

(65) Prior Publication Data
US 2019/0372446 A1  Dec. 5, 2019

(30) Foreign Application Priority Data
May 27, 2016  (JP) .................. 2016-106477

(51) Int. Cl.
*H02K 33/16* (2006.01)
*B06B 1/04* (2006.01)

(52) U.S. Cl.
CPC ............. *H02K 33/16* (2013.01); *B06B 1/045* (2013.01)

(58) Field of Classification Search
CPC .......... H02K 33/00; H02K 33/16; B06B 1/04; B06B 1/045

(Continued)

(56) References Cited

U.S. PATENT DOCUMENTS 5,894,263 A * 4/1999 Shimakawa ............. G08B 6/00
340/388.1
6,404,085 B2 * 6/2002 Hamaguchi ............. B06B 1/045
310/81

(Continued)

FOREIGN PATENT DOCUMENTS

| JP | H09-70571 A | 3/1997 |
|---|---|---|
| JP | 2004-195441 A | 7/2004 |
| JP | 2016-73941 A | 10/2017 |

OTHER PUBLICATIONS

International Search Report dated Jul. 4, 2017 during the prosecution of International Patent Application No. PCT/JP2017/015376.

*Primary Examiner* — Burton S Mullins

(74) *Attorney, Agent, or Firm* — Troutman Sanders LLP

(57) ABSTRACT

A vibration actuator has a frame; a first spring, supported on one end within the frame and the other end vibrates along an axial direction. A second spring, supported on one end within the frame, and the other end vibrates along the axial direction. A first weight connected to the other end of the first spring and a second weight connected to the other end of the second spring. A magnet portion protrudes in the axial direction is in the first weight and a coil wrapped around the magnet portion is in the second weight. A driving current of a frequency that is a first resonant frequency set by the spring constant of the first spring and the mass of the first weight or a second resonant frequency set by the spring constant of the second spring and the mass of the second weight is applied to the coil.

6 Claims, 3 Drawing Sheets

(58) Field of Classification Search
USPC .................................. 310/14, 15, 17, 20, 23
See application file for complete search history.

(56) References Cited

U.S. PATENT DOCUMENTS

| | | | | |
|---|---|---|---|---|
| 6,977,474 B2* | 12/2005 | Ueda | ..................... | B26B 19/282 |
| | | | | 318/128 |
| 7,148,636 B2* | 12/2006 | Ueda | ..................... | H02P 25/032 |
| | | | | 318/114 |
| 7,791,456 B2* | 9/2010 | Miura | ..................... | B06B 1/045 |
| | | | | 340/407.1 |
| 8,134,259 B2* | 3/2012 | Choi | ..................... | H02K 33/18 |
| | | | | 310/15 |
| 8,242,641 B2* | 8/2012 | Bae | ..................... | H02K 33/16 |
| | | | | 310/15 |
| 8,492,937 B2* | 7/2013 | Roberts | ..................... | H02K 35/00 |
| | | | | 310/25 |
| 8,957,558 B2* | 2/2015 | Choi | ..................... | H02K 33/16 |
| | | | | 310/14 |
| 2014/0070633 A1* | 3/2014 | Kim | ..................... | B06B 1/045 |
| | | | | 310/25 |

* cited by examiner

[FIG. 1]
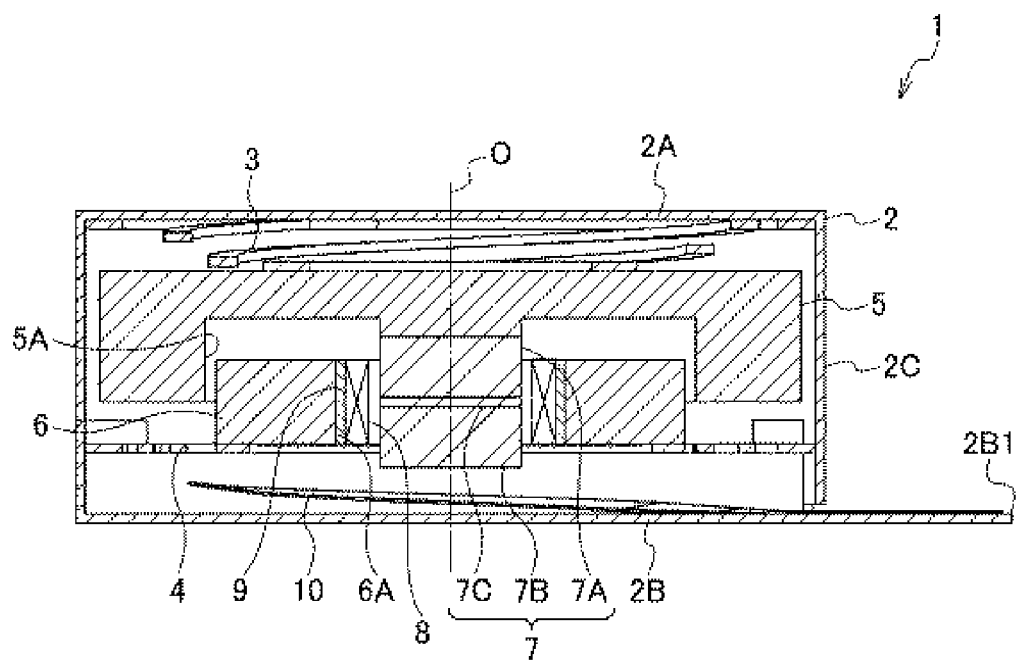

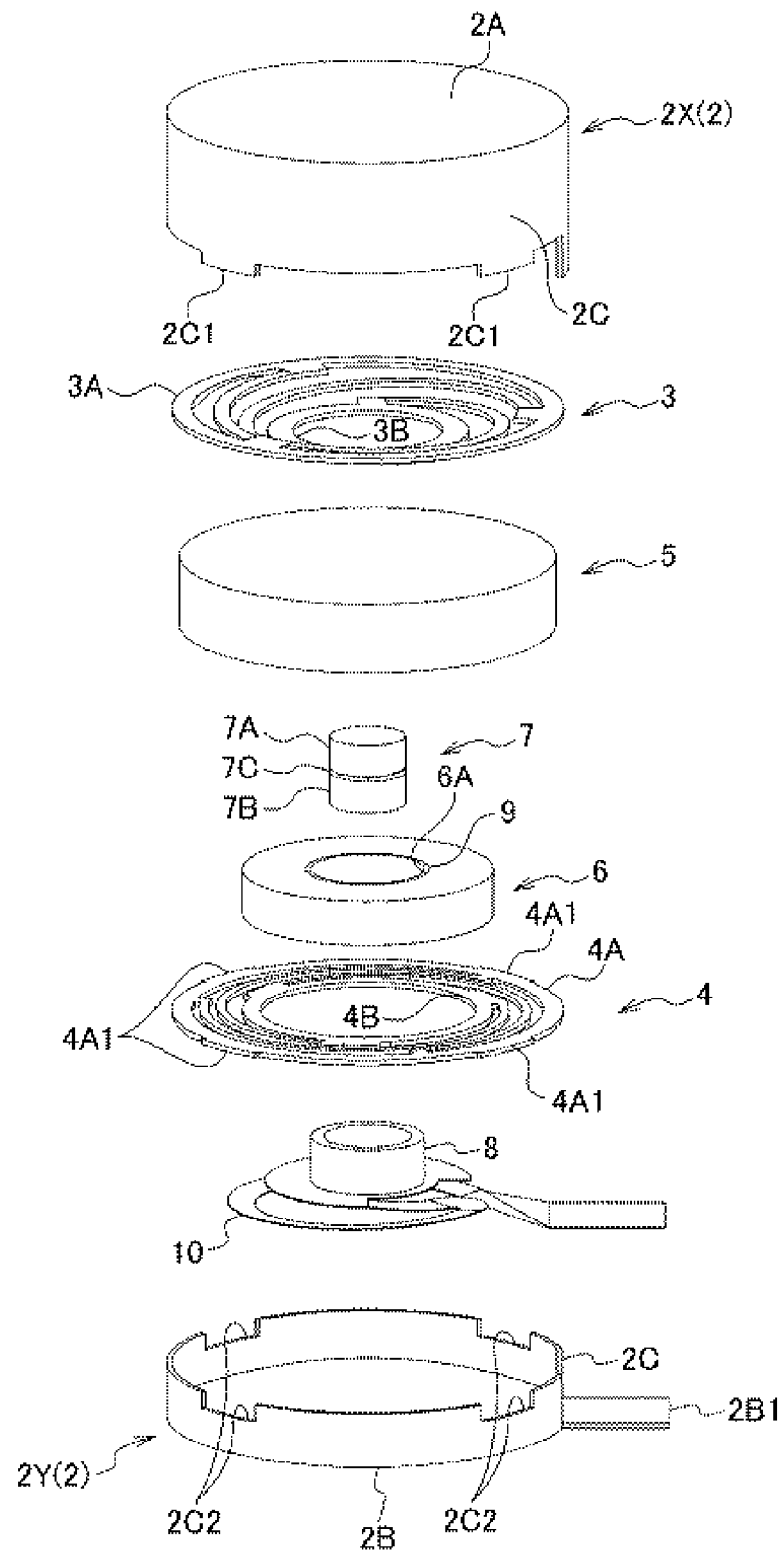
[FIG. 2]

[FIG. 3]
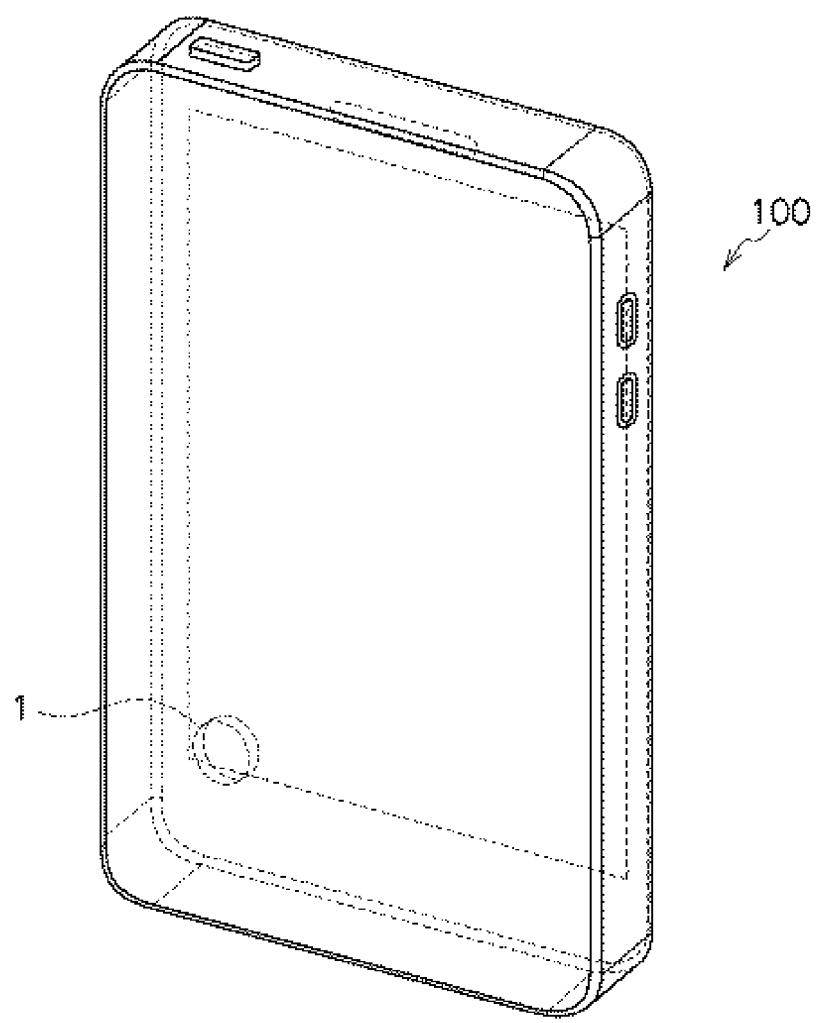

ically, to the direction of vibration, to
undergo reciprocating vibrations in the axial direction (referencing Japanese Unexamined Patent Application Publication 2016-73941).

VIBRATION ACTUATOR

CROSS-REFERENCE TO RELATED APPLICATIONS

This is a U.S. national phase application under 35 U.S.C. § 371 of International Patent Application No. PCT/JP2017/015376, filed Apr. 14, 2017, and claims benefit of priority to Japanese Patent Application No. 2016-106477, filed May 27, 2016. The entire contents of these applications are hereby incorporated by reference.

FIELD OF TECHNOLOGY

The present invention relates to a vibration actuator.

BACKGROUND

Vibration actuators (or "vibration motors") are built into mobile electronic devices, and are broadly used as devices to communicate to the user, through a vibration, that there is an incoming call, or that a signal, such as an alarm, has been generated, and have become indispensable devices in wearable devices, which are carried on the body of the user. Moreover, in recent years vibration actuators have been of interest as devices by which to achieve haptics (skin-sensed feedback) in the human interfaces such as touch panels.

Among the various forms of vibration actuators that are under development, vibration actuators that are able to generate relatively large vibrations through linear reciprocating vibrations of a movable element are of particular interest. Such vibration actuators are provided with a weight and a magnet on a movable element side, where an electric current is applied to a coil that is provided on the stator side to cause the Lorentz forces that act on the magnet to form a driving force, to cause the movable element, which is elastically supported along the direction of vibration, to undergo reciprocating vibrations in the axial direction (referencing Japanese Unexamined Patent Application Publication 2016-73941).

SUMMARY

This type of vibration actuator can produce a vibration with a large amplitude through applying, to the coil, an alternating current or a pulsed current with the resonant frequency that is set by the spring constants of the spring that elastically supports the movable element and the mass of the movable element (weight). However, because the resonant frequency has a single value for the vibration actuator, one vibration actuator can produce only one type of effective vibration, and thus there is a problem in that it is not possible to provide a different type of vibration sensation with a single vibration actuator.

The present invention is proposed in order to handle this type of situation, and the problems solved by the present invention is to enable the provision of different types of vibration sensations using a single vibration actuator, to enable a high degree of freedom in setting the frequencies of the vibrations that are set at that time, and so forth.

In order to solve such a problem, the vibration actuator according to the present invention is provided with the following structures:

A vibration actuator comprising: a frame; a first spring, supported on one end side within the frame, wherein the other end side is able to vibrate along an axial direction; a second spring, supported on one end side within the frame, wherein the other end side is able to vibrate along the axial direction; a first weight that is connected to the other end side of the first spring; and a second weight that is connected to the other end side of the second spring, wherein: a magnet portion that protrudes in the axial direction is provided in the first weight; a coil that is wrapped around the magnet portion is provided in the second weight; and a driving current of a frequency that is either a first resonant frequency that is set by the spring constant of the first spring and the mass of the first weight or a second resonant frequency that is set by the spring constant of the second spring and the mass of the second weight is applied to the coil.

BRIEF DESCRIPTIONS OF THE DRAWINGS

FIG. 1 is a cross-sectional view of a vibration actuator according to an embodiment according to the present invention.

FIG. 2 is a perspective assembly diagram of a vibration actuator according to an embodiment according to the present invention.

FIG. 3 is an explanatory diagram illustrating a mobile electronic device (a mobile information terminal) in which is provided a vibration actuator according to an embodiment according to the present invention.

DETAILED DESCRIPTION

Embodiments according to the present invention will be explained below in reference to the drawings. In the descriptions below, identical reference symbols in the different drawings below indicate positions with identical functions, and redundant explanations in the various drawings are omitted as appropriate.

In FIG. 1 and FIG. 2, the vibration actuator 1 comprises: a frame 2; a first spring 3, having one end side thereof supported within the frame 2 and the other end side able to vibrate along the axial direction (the direction along the axis O in the figures); a second spring 4, having one end side thereof supported within the frame 2 and the other end side able to vibrate along the axial direction (the direction along the axis O in the figures); a first weight 5 that is connected to the other end side of the first spring 3; and a second weight 6 that is connected to the other end side of the second spring 4. The frame 2 is a stationary element, and contains the first spring 3 and first weight 5, and the second spring 4 and second weight 6, which are movable elements.

There is no particular limitation on the shape of the frame 2, but, in the example in the figure, it is a round cylindrical shape that has a top face 2A, a bottom face 2B, and a side surface 2C. Moreover, as illustrated in FIG. 2, in the frame 2, the side surface 2C is separated in the axial direction (the direction along the axis O in the figure), and has a first frame 2X, which has a top face 2A, and a second frame 2Y, which has a bottom face 2B. The axis O in the figure is the axis of the round cylindrical frame 2, and the first frame 2X and the second frame 2Y are connected coaxially. In the example in the figure, a fitting protruding portion 2C1 is provided in the side surface 2C of the first frame 2X, and a fitting recessed portion 2C2 is provided in the side surface 2C of the second frame 2Y, and when connecting the first frame 2X and the second frame 2Y, the fitting protruding portion 2C1 is fitted into the fitting recessed portion 2C2.

In the example in the figure, the first spring 3 a disk-shaped leaf spring wherein the outer peripheral edge portion 3A is secured to the top face 2A of the frame 2, with one end side supported on the first frame 2X side, and the inner peripheral edge portion 3B is secured to the top end face of the first weight 5. Moreover, the second spring 4 is a disk-shaped leaf spring wherein the outer peripheral edge portion 4A is secured to the side surface 2C of the frame 2, one end side is supported on the second frame 2Y side, and the inner peripheral edge portion 4B is secured to the second weight 6.

A protruding portion 4A1 is provided on the outer peripheral edge portion 4A of the second spring 4, where the protruding portion 4A1 fits into the fitting recessed portion 2C2 that is provided in the side surface 2C of the second frame 2Y. Given this, when connecting the first frame 2X and the second frame 2Y, the fitting protruding portion 2C1 that is provided in the side surface 2C of the first frame 2X fits over the protruding portion 4A1 within the fitting recessed portion 2C2, so that the outer peripheral edge portion 4A of the second spring 4 is secured to the side surface 2C of the frame 2.

The first weight 5 that is connected to the first spring 3 and the second weight 6 that is connected to the second spring 4 are disposed coaxially, and a recessed portion 5A that is able to contain some or all of the second weight 6 is formed in the first weight 5 along the axial direction (the direction of the axis O), and an opening 6A is formed in the center portion of the second weight 6.

Given this, a magnet portion 7 that protrudes in the axial direction (the direction of the axis O) is provided in the first weight 5, and a coil 8 is provided coiled around the magnet portion 7 in the second weight 6. The magnet portion 7 is connected to the center portion of the first weight 5, where a pair of magnets 7A and 7B, which are magnetized along the axial direction (the direction of the O axis) are connected in mutually opposing directions through a central yoke 7C. The coil 8 is attached within an opening 6A in the second weight 6, and a back yoke 9 is disposed on the outer periphery of the coil 8.

In such a vibration actuator 1, application of the driving current to the coil 8 causes a driving force along the axial direction (the direction of the axis O) to act as an attractive force or repellent force between the magnet portion 7 and the coil 8, causing the weight 5 and the weight 6 to produce a vibration in the axial direction. Power is supplied to the coil 8 through a flexible substrate 10, where movable terminals of the flexible substrate 10 are connected to terminal portions of the coil 8, and the stationary end of the flexible substrate 10 is connected to an input terminal portion 2B1 that extends out from the bottom face 2B of the frame 2.

Here a driving current is applied to the coil 8 at a first resonant frequency f1, which is set by the spring constant of the first spring 3 and the mass of the first weight 5, or at a second resonant frequency f2, which is set by the spring constant of the second spring 4 and the mass of the second weight 6. Through this, when a driving current of the first resonant frequency f1 is applied, the first weight 5 side will vibrate with a large amplitude, and when a driving current with the second resonant frequency f2 is applied, the second weight 6 side will vibrate with a large amplitude.

The vibration actuator 1 is able to apply two types of vibration sensations through the proper use of the driving current with the first resonant frequency f1 and the driving current with the second resonant frequency f2. At this time, if the difference between the first resonant frequency f1 and the second resonant frequency f2 is set so as to be large, then it will be possible to produce effectively different vibration sensations.

A distinctive feature of this vibration actuator 1 is that the elements for setting the first resonant frequency f1 and the second resonant frequency f2 are independent. That is, the first spring 3 that supports the first weight 5 and the second spring 4 that supports the second weight 6 are connected mutually independently to the frame 2. Through this, it is possible to set the first resonant frequency f1 and the second resonant frequency f2 with a high degree of freedom.

Moreover, in the example in the figure, the first frame 2X and the second frame 2Y are separate, enabling the first spring 3, the first weight 5, and the magnet portion 7 to be connected to the first frame 2X side, and the second spring 4, the second weight 6, the coil 8, and the flexible substrate 10 to be connected to the second frame 2Y side, with the first frame 2X and the second frame 2Y connected together thereafter. This enables easy assembly. Moreover, in the example in the figures, a recessed portion 5A that is recessed in the direction of the axis O (the direction of vibration) is provided in the first weight 5, configured such that the second weight 6 will be contained within the recessed portion 5A at the time of vibration, thus enabling effective vibration to be carried out while suppressing the thickness in the direction of vibration.

FIG. 3 depicts a mobile information terminal 100 as an example of a mobile electronic device that is provided with a vibration actuator 1 according to an embodiment according to the present invention. The mobile information terminal 100 that is equipped with the vibration actuator 1 is able to produce vibrations that have different sensations depending on the type of signal that is sent, or depending on differences in information carried by the signal (for example, differences in callers, differences in levels of urgency, or the like). This makes it possible to convey information through the effective vibrations. Because the vibration sensations are different depending on the type of signal produced by the mobile information terminal side, this enables effective skin sensory feedback (haptics), such as in touch operations, and the like.

While embodiments according to the present invention were described in detail above, referencing the drawings, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

The invention claimed is:
1. A vibration actuator comprising:
a frame;
a first spring, supported on one end side within the frame, wherein the other end side is able to vibrate along an axial direction;
a second spring, supported on one end side within the frame, wherein the other end side is able to vibrate along the axial direction;
a first weight that is connected to the other end side of the first spring; and
a second weight that is connected to the other end side of the second spring, wherein:
a magnet portion that protrudes in the axial direction is provided in the first weight;
a coil that is wrapped around the magnet portion is provided in the second weight; and
a driving current of a frequency that is either a first resonant frequency that is set by the spring constant of the first spring and the mass of the first weight or a second resonant frequency that is set by the spring constant of the second spring and the mass of the second weight is applied to the coil.

2. The vibration actuator as set forth in claim 1, wherein: the second spring is a disk-shaped leaf spring that has an outer peripheral edge portion that is secured to an inner wall of the case, and an inner peripheral edge portion that is secured to the coil.

3. The vibration actuator as set forth in claim 1, wherein: the case comprises a first case for supporting one end side of the first leaf spring, and a second case for supporting one end side of the second spring, wherein the first case and the second case are connected coaxially.

4. The vibration actuator as set forth in claim 1, wherein: in the magnet portion, a pair of magnets that are magnetized along the axial direction are connected, in mutually opposing directions, through a center yoke, and a back yoke is disposed on the outer periphery of the coil.

5. The vibration actuator as set forth in claim 1, wherein: a recessed portion for containing the second weight that vibrates is provided in the first weight, along the axial direction.

6. A mobile electronic device comprising a vibration actuator as set forth in claim 1.

\* \* \* \* \*